US008823578B2

(12) United States Patent
Hattori et al.

(10) Patent No.: US 8,823,578 B2
(45) Date of Patent: Sep. 2, 2014

(54) DRIVING ASSIST APPARATUS

(75) Inventors: Toshihiro Hattori, Okazaki (JP);
Mitsuyasu Matsuura, Chiryu (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 263 days.

(21) Appl. No.: 13/418,436

(22) Filed: Mar. 13, 2012

(65) Prior Publication Data
US 2012/0235852 A1    Sep. 20, 2012

(30) Foreign Application Priority Data

Mar. 15, 2011 (JP) .................................. 2011-56676

(51) Int. Cl.
*G01S 13/93* (2006.01)
*G01S 13/522* (2006.01)
*G01S 15/93* (2006.01)
*G01S 15/52* (2006.01)
*G01S 15/87* (2006.01)
*G01S 15/58* (2006.01)
*G01S 15/10* (2006.01)
*B60W 30/095* (2012.01)
*G01S 13/00* (2006.01)
*G01S 15/00* (2006.01)

(52) U.S. Cl.
CPC .................. *G01S 15/10* (2013.01); *G01S 15/87* (2013.01); *G01S 15/582* (2013.01); *B60W 2420/60* (2013.01); *G01S 2015/938* (2013.01); *G01S 15/931* (2013.01); *B60W 30/0956* (2013.01); *G01S 2015/933* (2013.01); *B60W 2550/306* (2013.01)
USPC ................... 342/70; 342/27; 342/28; 342/89; 342/91; 342/98; 342/104; 342/105; 342/107; 342/109; 342/113; 342/114; 342/115; 342/118; 342/134; 342/135; 342/139; 342/146; 342/147; 342/175; 342/195; 340/901; 340/902; 340/903; 340/904; 701/300; 701/301; 367/87; 367/89; 367/90; 367/91; 367/93; 367/94; 367/95; 367/97; 367/98; 367/99

(58) Field of Classification Search
USPC ............. 342/27, 28, 70–72, 89–93, 118, 127, 342/134–147, 175, 195, 104–116; 367/87, 367/89–100, 117; 340/901–905; 356/3, 356/4.01, 5.01, 5.1–5.15; 701/300, 301
See application file for complete search history.

(56) References Cited

U.S. PATENT DOCUMENTS 3,152,326 A * 10/1964 Merlo ............................. 342/71
3,176,294 A * 3/1965 Merlo et al. .................... 342/71
(Continued)

FOREIGN PATENT DOCUMENTS

JP          S6090040 U      6/1985
JP          A-H06-040886    5/1994
(Continued)

OTHER PUBLICATIONS

Office Action mailed Apr. 23, 2013 in corresponding JP Application No. 2011-056676 (and English translation).

*Primary Examiner* — Bernarr Gregory
(74) *Attorney, Agent, or Firm* — Posz Law Group, PLC

(57) ABSTRACT

A driving assist apparatus for a vehicle is disclosed. The driving assist apparatus includes a transmitter for transmitting a transmission wave, a receiver for receiving a reflected wave, an obstacle presence determination section for detecting a presence of an obstacle in the surrounding of the vehicle based on the reflected wave, a measurement section for measuring a frequency of phase delay and advance of the reflected wave with respect to a reference signal, and a detection section for detecting the obstacle having a specific relation with the vehicle based on the presence of the obstacle determined by the obstacle presence determination section and the frequency of delay and the frequency of advance measured by the measurement section.

12 Claims, 10 Drawing Sheets

(56) References Cited

U.S. PATENT DOCUMENTS

| | | | |
|---|---|---|---|
| 3,716,833 A * | 2/1973 | Roth | 340/904 |
| 3,730,628 A * | 5/1973 | Wolcott et al. | 356/5.11 |
| 3,772,690 A * | 11/1973 | Nations | 342/72 |
| 3,779,645 A * | 12/1973 | Nakazawa et al. | 356/5.13 |
| 3,789,950 A * | 2/1974 | Strenglein | 342/72 |
| 3,809,477 A * | 5/1974 | Russell | 356/5.1 |
| 4,148,028 A | 4/1979 | Fujiki | |
| 5,134,411 A * | 7/1992 | Adler | 342/70 |
| 5,581,232 A | 12/1996 | Tanaka et al. | |
| 5,731,781 A * | 3/1998 | Reed | 342/135 |
| 5,742,379 A * | 4/1998 | Reifer | 356/5.13 |
| 5,757,848 A * | 5/1998 | Hogberg | 342/145 |
| 5,805,468 A * | 9/1998 | Blohbaum | 356/5.01 |
| 5,889,490 A * | 3/1999 | Wachter et al. | 367/100 |
| 6,002,342 A * | 12/1999 | Leitch | 342/147 |
| 6,100,539 A * | 8/2000 | Blumcke et al. | 356/5.01 |
| 6,122,602 A * | 9/2000 | Michalski et al. | 342/118 |
| 6,133,993 A * | 10/2000 | Labaar | 356/5.1 |
| 6,211,812 B1 * | 4/2001 | Chiles et al. | 342/145 |
| 6,424,289 B2 * | 7/2002 | Fukae et al. | 342/27 |
| 6,462,705 B1 * | 10/2002 | McEwan | 342/175 |
| 6,512,575 B1 * | 1/2003 | Marchi | 356/5.1 |
| 6,614,387 B1 * | 9/2003 | Deadman | 342/70 |
| 6,628,374 B2 * | 9/2003 | Shirai et al. | 356/5.01 |
| 6,693,582 B2 * | 2/2004 | Steinlechner et al. | 342/70 |
| 6,822,605 B2 * | 11/2004 | Brosche | 342/145 |
| 6,864,834 B2 * | 3/2005 | Walton | 342/195 |
| 7,339,655 B2 * | 3/2008 | Nakamura et al. | 356/5.1 |

FOREIGN PATENT DOCUMENTS

| | | |
|---|---|---|
| JP | 6203299 A | 7/1994 |
| JP | 8268189 A | 10/1996 |
| JP | 8324366 A | 12/1996 |
| JP | A-H11-259634 | 9/1999 |
| JP | A-2006-309623 | 11/2006 |

* cited by examiner

DRIVING ASSIST APPARATUS

CROSS REFERENCE TO RELATED APPLICATION

The present application is based on and claims priority to Japanese Patent Application No. 2011-56676 filed on Mar. 15, 2011, disclosure of which is incorporated herein by reference.

TECHNICAL FIELD

The present discloser relates to a driving assist apparatus.

BACKGROUND

A technique for assisting driver's driving by detecting an obstacle around an own vehicle with a sensor is known. For example, Patent Document 1 discloses the technique for detecting a side-by-side running vehicle in a blind spot and a relative velocity of the side-by-side running vehicle with an ultrasonic sensor. In the present disclosure, the side-by-side running vehicle refers to a vehicle that is running side-by-side with the own vehicle.

More specifically, according to the technique of Patent Document 1, frequency analysis is performed on a transmitted wave and a received ultrasonic wave to detect a frequency difference between the transmitted wave and the received wave. Based on the frequency difference, the relative velocity of the side-by-side running vehicle is detected. That is, the technique uses a Doppler effect, which shifts the frequency when the ultrasonic wave is incident on a moving body at a certain angle and is returned from the moving body. Based on a frequency shift amount, the relative velocity is detected.

Furthermore, according to the technique of Patent Document 1, a frequency band of a receiver of the ultrasonic sensor is limited to "f±α (kHz)", where f is the frequency of the transmitted wave. When the frequency shift amount of the reflected wave detected with the receiver is less than "α", it is determined that an object having the small relatively velocity is detected, i.e., the side-by-side running vehicle is detected.
Patent Document 1: JP-H8-268189A According to the technique of Patent Document 1, since the frequency band of the receiver of the ultrasonic sensor is limited to "f±α (kHz) in order to detect the side-by-side running vehicle, the reflected wave having the frequency out of the limited band is not received. Therefore, objects other than side-by-side running vehicle cannot be detected. System versatility is disadvantageously low.

Furthermore, according to the technique of Patent Document 1, the frequency analysis is performed to detect the frequency difference between the transmitted wave and the received wave. However, the frequency analysis such as FFT (Fast Fourier Transform) typically requires a complicated analysis to detect the frequency. Therefore, a large amount of time and work is disadvantageously required.

SUMMARY

In view of the foregoing, it is an object of the present disclosure to provide a high versatile driving assist apparatus that can readily detect an obstacle around own vehicle while using a Doppler effect.

According to one example of the present disclosure, a driving assist apparatus mounted to an own vehicle comprises: a transmitter configured to successively transmit a transmission wave having a constant frequency to a surrounding of the own vehicle; a receiver configured to successively receive a reflected wave of the transmission wave; an obstacle presence determination section configured to determine a presence and an absence of an obstacle in the surrounding of the own vehicle based on the reflected wave received by the receiver; a measurement section configured to compare phase of the reflected wave, which is received by the receiver, with phase of a reference signal, which has a frequency synchronized with the frequency of the transmission wave, and thereby measure a frequency of delay and a frequency of advance of the phase of the reflected wave with respect to the phase of the reference signal; and a detection section configured to detect the obstacle having a specific relation with the own vehicle, based on the presence of the obstacle determined by the obstacle presence determination section and the frequency of delay and the frequency of advance measured by the measurement section.

According to the above configuration, the driving assist apparatus can have a high versatility, and readily detect an obstacle around own vehicle while using a Doppler effect.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment will be described with reference to the drawings.

Figure 1:
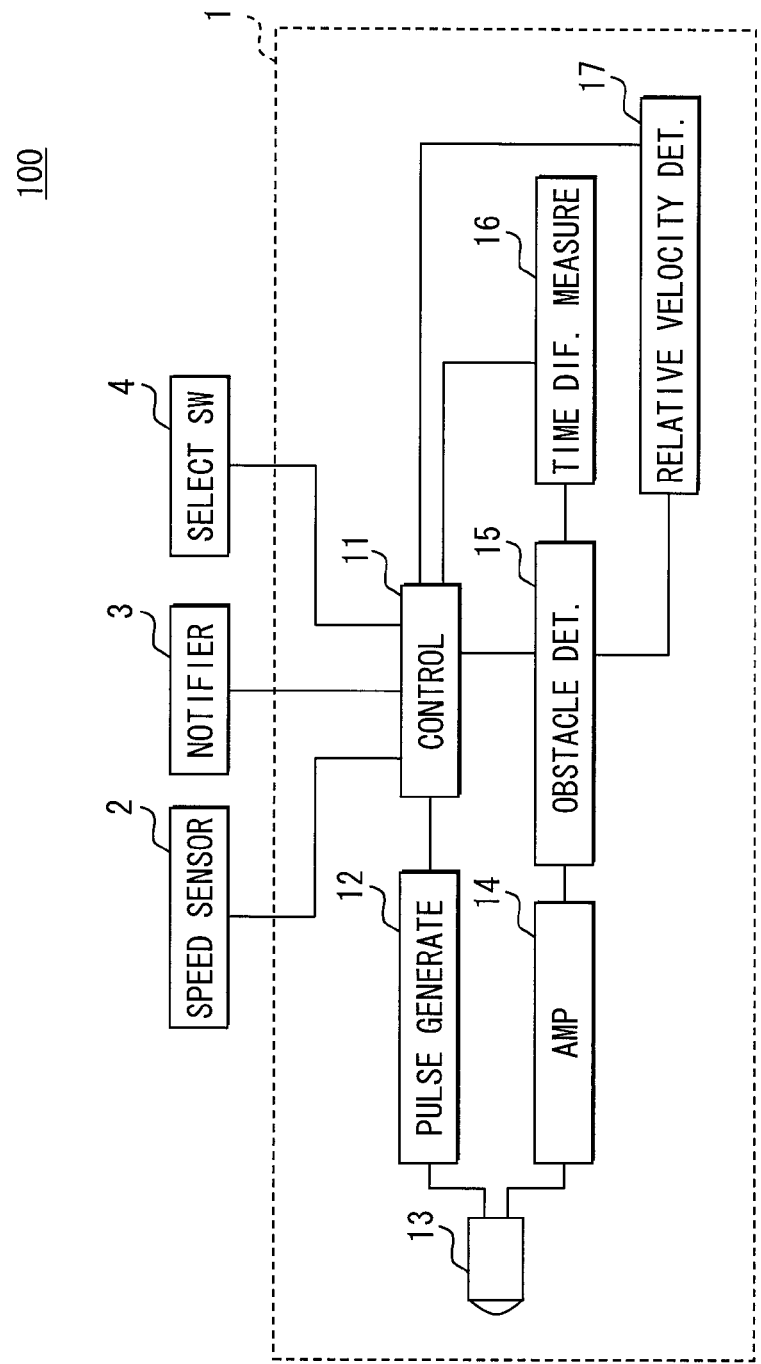
FIG. 1 is a diagram illustrating a driving assist system of one embodiment.

FIG. 1 is a block diagram illustrating a schematic configuration of a driving assist system 100 of one embodiment. The driving assist system 100 is mounted to a vehicle and includes an obstacle detection apparatus 1, a vehicle speed sensor 2, a notification device 3, and a function selection switch 4. The vehicle equipped with the driving assist system 100 is called an own vehicle.

The vehicle speed sensor 2 detects speed of the own vehicle. The notification device 3 notifies a variety of information to the driver of the own vehicle. For example, the notification device 3 includes a speaker, which outputs speech according to instructions of the obstacle detection apparatus 1. Alternatively, the notification device 3 may include a display and may display a text and/or an image according to instructions of the obstacle detection apparatus 1. Alternatively, the notification device 3 may include a LED or the like, and provide an indicator display according to instructions of the obstacle detection apparatus 1. The notification device 3 may include a combination of the speaker, the display, the LED and/or the like. The function selection switch 4 allows a user to select whether to operate the obstacle detection apparatus 1 to detect in the surrounding of the own vehicle. The function selection switch 4 is installed at a place manipulatable by the driver of the own vehicle.

The obstacle detection apparatus 1 detects an obstacle in the surrounding of the own vehicle. As shown in FIG. 1, the obstacle detection apparatus 1 includes a controller 11, a transmission pulse generator 12, a transceiving microphone 13, a received wave amplification circuit, 14, an obstacle presence determination circuit 15, a time difference measurement circuit 16, and a relative speed range determination circuit 17. The controller 11 includes a computer. For example, the controller 11 includes a central processing unit (CPU), a read-only memory (ROM), an electrically erasable programmable read-only memory (EEPROM), a random access memory, an input/output (I/O), and a bus line connecting the foregoing components.

An operation flow of the obstacle detection apparatus 1 will be described with reference to FIG. 2. When a user manipulates the function selection switch 4 to enable the obstacle detection of the obstacle detection apparatus 1, the obstacle detection apparatus 1 starts the operation flow illustrated in FIG. 2. In the present disclosure, a function selection ON state refers to a state in which the obstacle detection of the obstacle detection apparatus 1 is enabled and selected in the function selection switch 4. A function selection OFF state refers to a state in which the obstacle detection of the obstacle detection apparatus is not enabled and not selected in the function selection switch 4.

Figure 3:
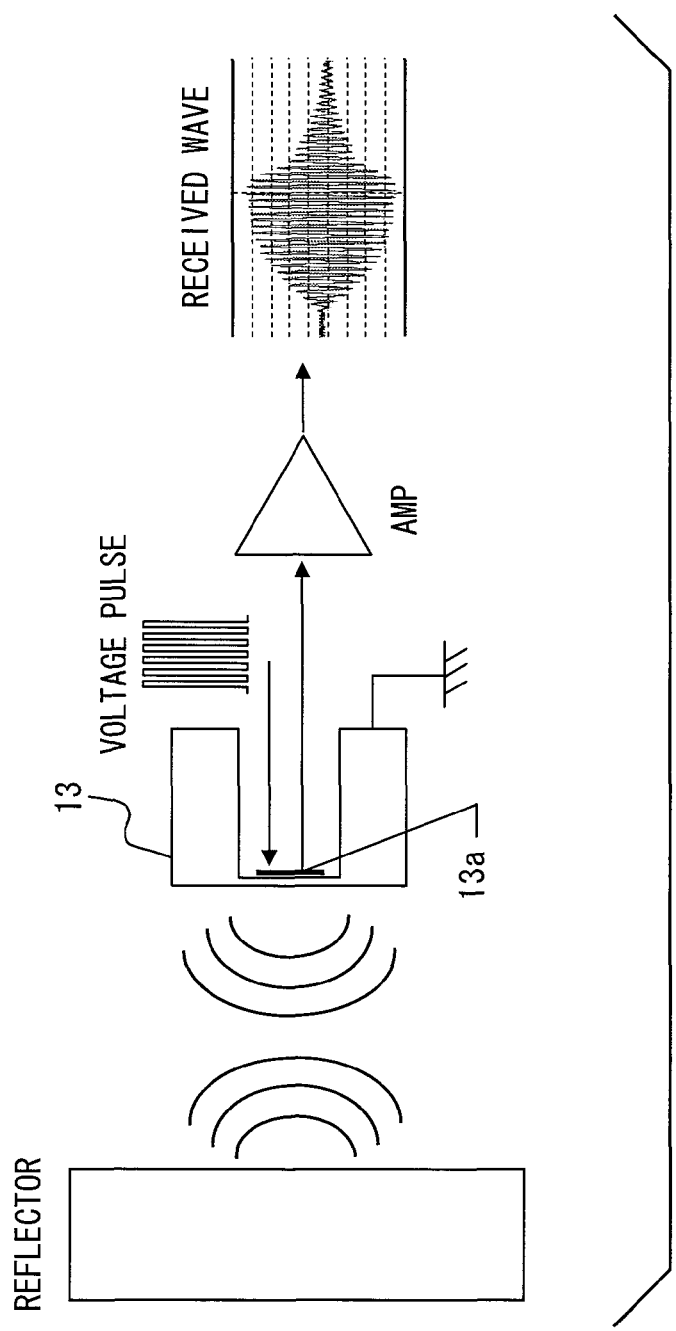
FIG. 3 is a diagram illustrating transmission and reception at the obstacle detection apparatus.

In step S1, a transmission process is performed. In the transmission process, the controller 11 generates a pulse signal having a constant frequency (angular frequency) and outputs the pulse signal to the transmission pulse generator 12. According to the pulse signal from the controller 11, the transmission pulse generator 12 generates a voltage pulse and outputs the voltage pulse to the transceiving microphone 13. A piezoelectric element 13a (see FIG. 3) of the transceiving microphone 13 is supplied with the voltage pulse from the transmission pulse generator 12 and is driven to generate an ultrasonic wave, which is transmitted toward an outside of the transceiving microphone 13. The controller 11, the transmission pulse generator 12 and the transceiving microphone 13 can corresponds to a transmission means or section and transmitter.

In step S2, a reception process is performed. In the reception process, the transceiving microphone 13 receives a reflected wave of the transmitted ultrasonic wave. When the transceiving microphone 13 receives the reflected wave, a voltage is generated in the piezoelectric element 13a. The voltage generated in the piezoelectric element 13a is the received wave and is amplified in the received wave amplification circuit 14. The amplified received wave is outputted to the obstacle presence determination circuit 15 (see FIG. 5). The transceiving microphone 13 can correspond to a reception means or section and a receiver.

The driving assist system 100 may employ a single transceiving microphone 13. However, in the present embodiment, the driving assist system 100 employs multiple transceiving microphones 13 to search and detect an obstacle in the surrounding of the own vehicle in various directions. When employing the multiple transceiving microphones 13, the driving assist system 100 is equipped with a switch for switching an object transceiving microphone 13 between the multiple transceiving microphones 13. At predetermined intervals, the controller 11 changes over the object transceiving microphone 13 by controlling the switch.

Figure 4A:
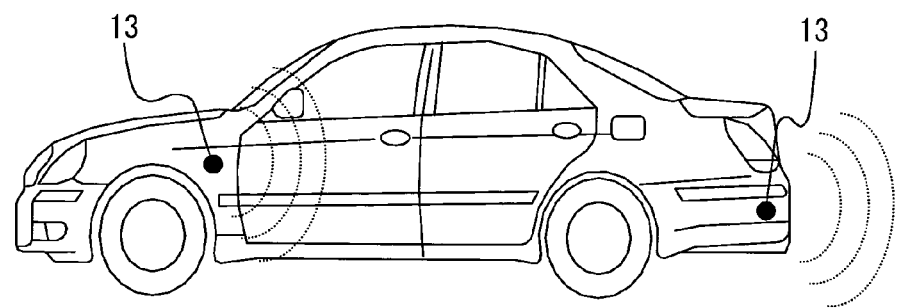
FIGS. 4A and 4B are diagrams illustrating installation places and directions of multiple transceiving microphones in the driving assist system.
Figure 4B:
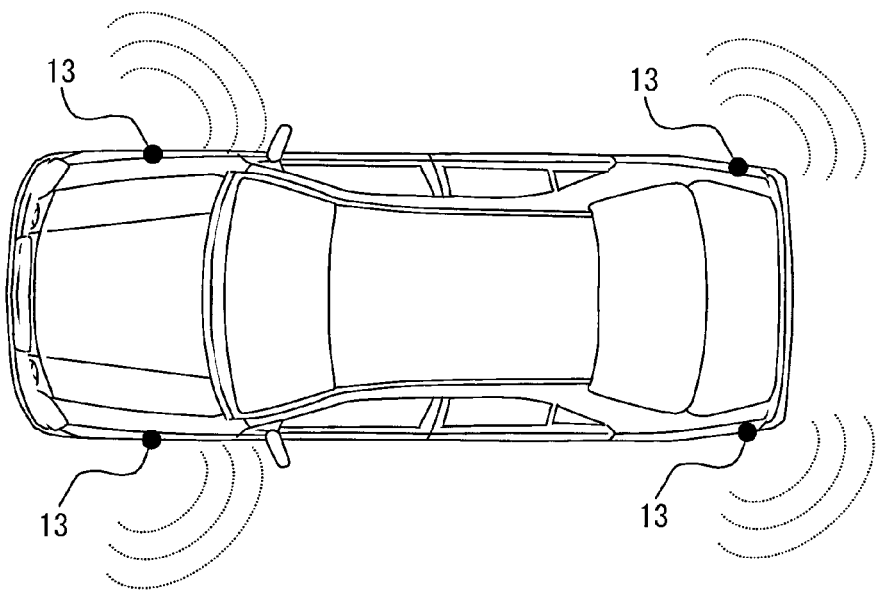

With reference to FIGS. 4A and 4B, installation places of and directions of the multiple transceiving microphones 13 in the driving assist system 100 will be described. FIGS. 4A and 4B illustrate the installation places of and directions of the multiple transceiving microphones 13 in the driving assist system 100.

As shown in FIGS. 4A and 4B, the driving assist system 100 is equipped with four transceiving microphones 13 (i.e., ultrasonic sensors), which are installed at a front portion of a left side surface (referred to also as "front left") of the vehicle body of the own vehicle, a rear portion of the left side surface (referred to also as "rear left") of the vehicle body, a front portion of a right side surface (referred to also as "front right") of the vehicle body, and a rear portion of the right side surface (referred to also as "rear right") of the vehicle body, respectively.

The transceiving microphones 13 at the front left and the front right are positioned so that the transceiving microphones 13 can transmit the ultrasonic wave toward a blind spot of an outer rear view mirror such as a fender mirror and a door mirror and can detect a lateral obstacle existing in the blind spot. Herein, the blind spot of the outer rear view mirror refers to an area that the driver seated on a driver seat of the own vehicle cannot visually check with the outer rear view mirror.

Figure 5:
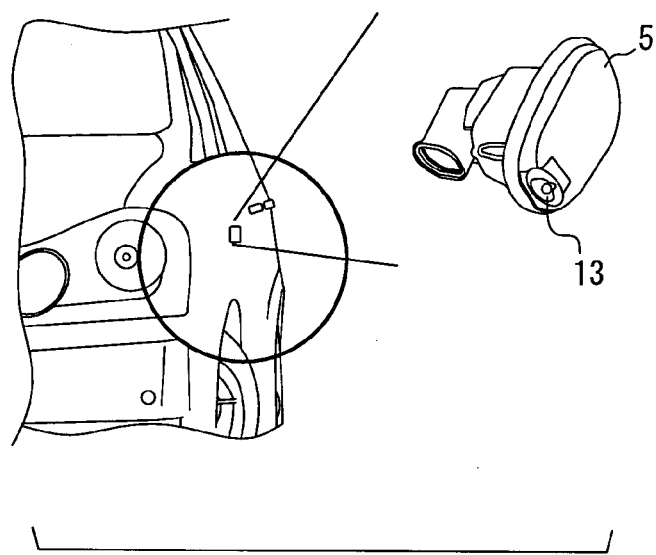
FIG. 5 is a diagram illustrating installation of a transceiving microphone and a side marker integrated with each other.

For example, the transceiving microphones 13 are installed at the front left and the front right of the vehicle body of the own vehicle so that a transmission direction of the ultrasonic wave is diagonally rearward with respect to the side surfaces of the vehicle body. As shown in FIG. 5, the transceiving microphones 13 at the front left and the front right may be integrated with side markers 5 of the own vehicle. Alternatively, the transceiving microphones 13 at the front left and the front right may be installed in vicinity of the door mirrors.

The transceiving microphones 13 at the rear left and the rear right are positioned so that the transceiving microphones 13 can transmit the ultrasonic wave toward a blind spot of an inner rear view mirror such as a room mirror and the like, and can detect a rearward lateral obstacle existing in the blind spot of the inner rear view mirror. Herein, the blind spot of the inner rear view mirror refers to an area that the driver seated on a driver seat of the own vehicle cannot visually check with the inner rear view mirror.

For example, the transceiving microphone 13 at the rear left is installed at a rear left corner of the vehicle body of the own vehicle. The transceiving microphone 13 at the rear right is installed at a rear right corner of the vehicle body of the own vehicle. The transceiving microphone 13 at the rear left and at the rear right are positioned so that a transmission direction of the ultrasonic wave is diagonally rearward with respect to the side surfaces of the vehicle body.

Figure 2:
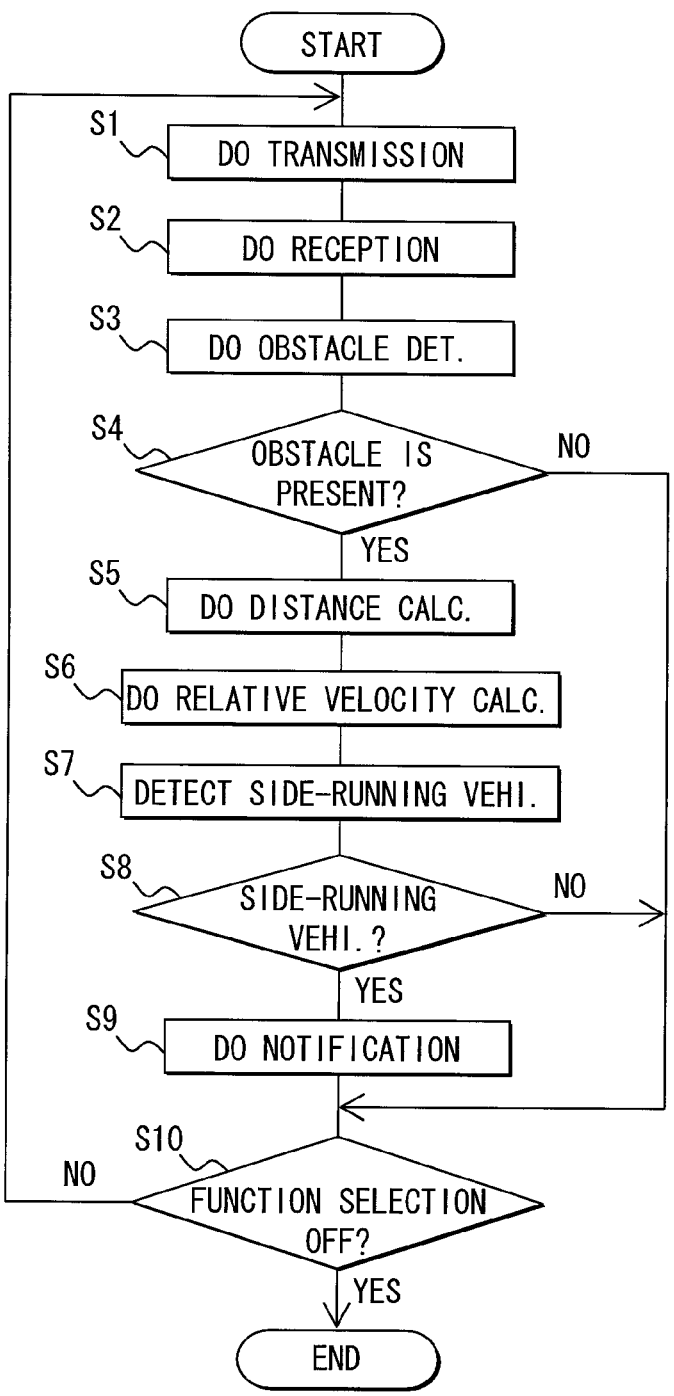
FIG. 2 is flowchart illustrating an operation flow of an obstacle detection apparatus.

Explanation returns to FIG. 2. In step S3, an obstacle presence determination process is performed. In the obstacle presence determination process, the obstacle presence determination circuit 15 determines whether or not an amplitude component of the received wave amplified by the received wave amplification circuit 14 exceeds a predetermined threshold. Herein, the amplitude component may refer to a total amplitude of the received wave or a half amplitude of the received wave. The predetermined threshold may be settable to an arbitrary value as long as the predetermined threshold is larger than at least a total or half amplitude of noise.

To the controller 11, the obstacle presence determination circuit 15 outputs a result of the determination as to whether or not the received wave magnitude exceeds the predetermined threshold. Based on the result of the determination in the obstacle presence determination circuit 15, the controller 11 determines whether or not the obstacle is present. Specifically, when the inputted result of the determination indicates that the received wave magnitude exceeds the predetermined threshold, the controller 11 determines that the obstacle is present. When the inputted result of the determination indicates that the received wave magnitude does not exceed the predetermined threshold, the controller 11 determines that the obstacle is not present. The controller 11 can correspond to an obstacle presence determination section or means.

Since the present embodiment employs the multiple transceiving microphones 13 to detect obstacles in various directions in the surrounding of the own vehicle, the controller 11 may determine a direction of the obstacle based on which multiple transceiving microphone 13 provides (detect) the received wave. For example, when the transceiving microphone 13 at the front left provides the received wave, the controller 11 determines that the obstacle is present on a left side of the own vehicle. When the transceiving microphone 13 at the front right provides the received wave, the controller 11 determines that the obstacle is present on a right side of the own vehicle. When the transceiving microphone 13 at the rear left provides the received wave, the controller 11 determines that the obstacle is present on a rear left side of the own vehicle. When the transceiving microphone 13 at the rear right provides the received wave, the controller 11 determines that the obstacle is present on a rear right side of the own vehicle.

When the controller 11 determines that the obstacle is present in step S4 (YES in step S4), the procedure proceeds to step S5. When the controller 11 determines that the obstacle is not present in step S4 (NO in step S4), the procedure proceeds to step S10.

In step S5, a distance calculation process is performed. In the distance calculation process, the time difference measurement circuit 16 calculates a time difference between transmission and reception, which is a difference between a time of transmission of a transmission wave and a time of reception of a reflected wave of the transmission wave. The time of transmission and the time of reception can be obtained from the controller 11 and the obstacle presence determination circuit 15, respectively. The time difference measurement circuit 16 outputs the calculated time difference to the controller 11. The controller 11 calculates a distance to the obstacle based on the time different and the sound speed of the ultrasonic wave. The controller 11 can correspond to a distance calculation means or section. The distance to be calculated may be a distance between the transceiving microphone 13 and the obstacle.

Figure 6:
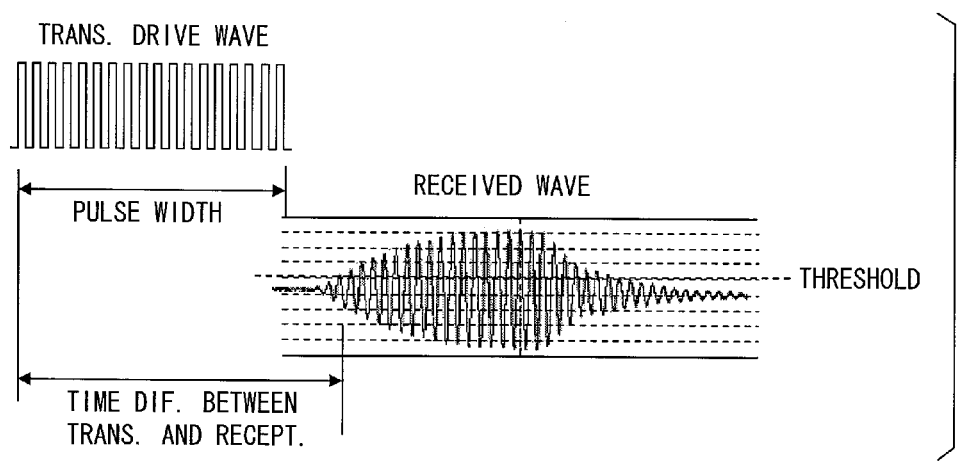
FIG. 6 is a diagram for explaining times of transmission and reception.

Next, with reference to FIG. 6, explanation will be given on examples of the time of transmission of the transmission wave (referred to also as "transmission time") and a time of reception of the reflected wave (referred to also as "reception time"). FIG. 6 is a diagram for explaining the transmission time and the reception time. In exemplary configurations, as shown in FIG. 6, the transmission time is a time at which the transmission pulse generator 12 starts supplying the voltage pulse (i.e., a transmission drive signal) to the piezoelectric element 13*a*. The reception time is a time at which the amplitude component of the received wave, which is obtained by receipt of the reflected wave, first exceeds the above-described threshold.

In step S6, a relative velocity range calculation process is performed. In the relative velocity range calculation process, the relative velocity range determination circuit 17 receives a reference signal, which has a frequency synchronized with the frequency of the transmission wave. Further, the relative velocity range determination circuit 17 receives the received wave from the received wave amplification circuit 14 via the obstacle presence determination circuit 15. Based on the reference signal and the receives wave, the relative velocity range determination circuit 17 counts a number of reverse-phase of the received wave with respect to the reference signal, and outputs the number of phase-reverse to the controller 11. As for the reference signal, a rectangular wave generator (not shown) may generate a rectangular wave having an angular frequency synchronized with an angular frequency of the transmission drive signal. The rectangular wave generator may input this rectangular wave as the reference signal to the relative velocity range determination circuit 17.

Processing in the relative velocity range determination circuit 17 will be more specifically described. First, the relative velocity range determination circuit 17 binarizes the inputted received wave based on whether the inputted received wave exceeds a threshold. In this way, the relative velocity range determination circuit 17 obtains a binarized received signal. To obtain the binarized received signal from the received wave, the relative velocity range determination circuit 17 may use a comparator.

Figure 7:
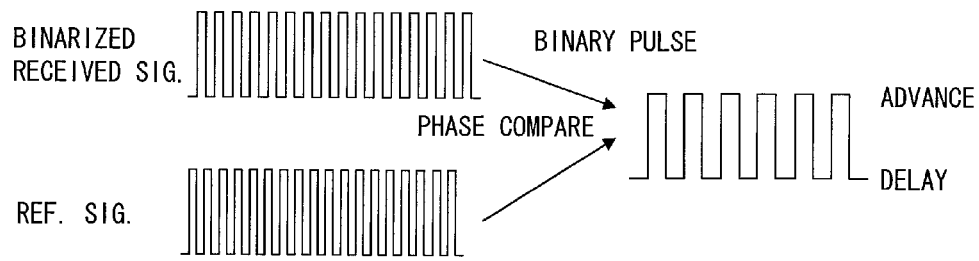
FIG. 7 is a diagram illustrating one example of processing in a relative velocity range determination circuit.
Figure 8:
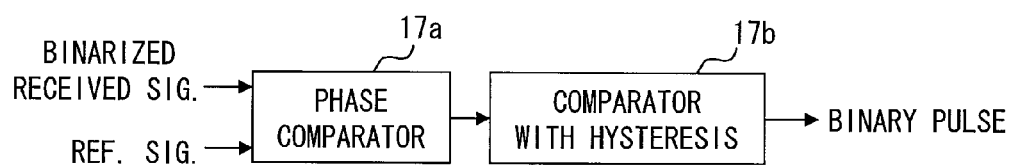
FIG. 8 is a diagram illustrating one example configuration of the relative velocity range determination circuit.

Thereafter, as shown in FIG. 7, the relative velocity range determination circuit 17 compares phase of the binarized received signal with phase of the reference signal, thereby obtaining a binary pulse that corresponds to delay and advance of phase of the binarized received signal with respect to the phase of the reference signal. The relative velocity range determination circuit 17 can correspond to a binary pulse generation means or section. As shown in FIG. 8 for instance, the relative velocity range determination circuit 17 may include a phase comparator 17*a* and a comparator with hysteresis 17*b* to obtain the binary pulse from the reference signal and the reception binary signal, so that the binary pulse corresponds to phase delay and phase advance of the reception binary signal with respect to the reference signal.

Figure 9:
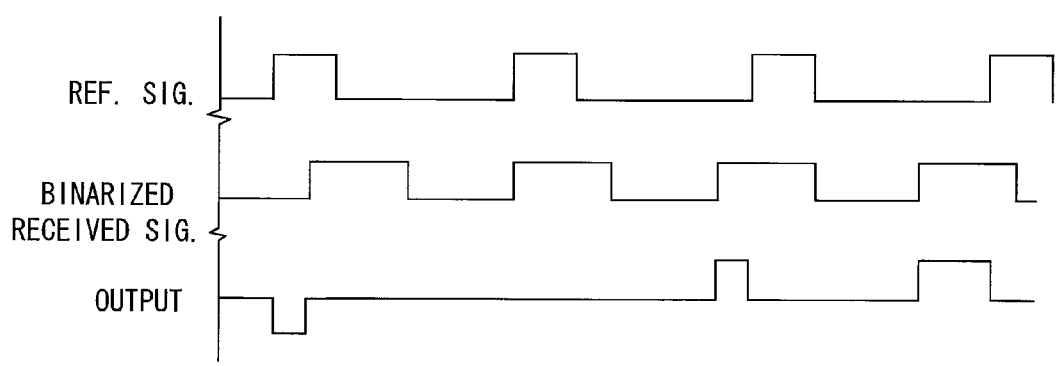
FIG. 9 is a diagram for explaining a phase comparator.

The phase comparator 17*a* may perform phase comparison and selectively output positive and negative pulses based on the comparison result. For example, as shown in FIG. 9, when the phase of the binarized received signal is advanced with respect to the phase of the reference signal, the positive pulse is outputted. When the phase of the binarized received signal is delayed with respect to the phase of the reference signal, the negative pulse is outputted. With use of the comparator with hysteresis 17*b*, the binary pulse corresponding to phase delay and phase advance of the reception binary signal with respect to the reference signal can be obtained.

Furthermore, the relative velocity range determination circuit 17 counts a number of pulses of the obtained binary pulse per predetermined time to obtain a count value, and output the count value to the controller 11. The relative velocity range determination circuit 17 can correspond to a count section or means, or a measurement section or means. This count value corresponds to the above-mentioned number of phase-reverse. It should be noted that the predetermined time may be arbitrarily settable. The number of pulses may refer to the number of repetition a pulsed activity (transition to a high level and then to a low level) occurs, or the number of rising edge, the number of falling edges, or the like.

As the relative velocity of the obstacle is larger, the frequency of the reflected wave reflected by the obstacle departs from the frequency of the reference signal to a larger extent. Thus, as the relative velocity of the obstacle becomes larger, the number of times the phase of the reflected wave is advanced or delayed with respect to the phase of the reference signal during a given period becomes larger. That is, a frequency (number of times per the predetermined time) of delay and a frequency of advance of the phase of the reflected wave with respect to the phase of the reference signal increases with increasing relative velocity of the obstacle. Because of this, the count value becomes larger with increasing relative velocity of the obstacle, and becomes smaller with decreasing relative velocity of the obstacle. The count value is hence an indicator of the relative velocity of the obstacle.

In step S7, a side-by-side running vehicle detection process is performed. In the side-by-side running vehicle detection process, the controller 11 determines whether or not the obstacle is the side-by-side running vehicle, based on the distance to obstacle calculated in the distance calculation process and the count value obtained in the relative velocity range calculation process. The controller 11 can correspond to a detection means or section.

More specifically, when (i) the distance to the obstacle is less than or equal to a predetermined distance and (ii) the count value is less than or equal to a first preset value, the controller 11 determines that the obstacle is the side-by-side running vehicle. When (i) the distance to the obstacle is not less than or equal to the predetermined distance or (ii) the count value is not less than or equal to the first preset value, the controller 11 determines that the obstacle is not the side-by-side running vehicle. The controller 11 can correspond to a first threshold determination section or means. The first preset value can correspond to a first threshold. In the side-by-side running vehicle detection process, based on whether or not the count value is not less than or equal to the first preset value, it is determined whether or not the relative velocity is less than or equal to a given value. In this way, the count value is used to detect the side-by-side running vehicle.

The above-described predetermined distance is a distance that is arbitrarily settable in consideration of an inter-vehicle distance that requires attention of the drive of the own vehicle. The controller 11 may change this predetermined distance according to vehicle speed inputted from the vehicle speed sensor 2 so that, for example, the smaller the vehicle speed, the larger the predetermined distance. The first preset value is arbitrarily settable according to relative velocities of vehicles that are to be detected as the side-by-side running vehicles.

When it is determined that the side-by-side running vehicle is detected in the side-by-side running vehicle detection process in step S8 (YES in step S8), it is concluded that the side-by-side running vehicle is detected. In this case, the procedure proceeds to step S9. When it is determined that the side-by-side running vehicle is not detected in the side-by-side running vehicle detection process in step S8 (NO in step S8), it is concluded that the side-by-side running vehicle is not detected. In this case, the procedure proceeds to step S10.

In step S9, a notification process is performed. In the notification process, the controller 11 instructs the notification device 3 to notify that side-by-side running vehicle is present. The controller 11 can correspond to a notification means or section. Because of this notification, the driver can recognize that the side-by-side running vehicle is present in the blind spot of the outer rear view mirror or the inner rear view mirror of the own vehicle. A manner of notifying the presence of the side-by-side running vehicle may include a warning sound output, a guidance speed, an indicator display, a tent display, an icon display, and the like. When the driving assist system 100 is configured to further detect the direction to the obstacle, the direction to the obstacle may be also notified.

In step S10, it is determined whether the function selection switch 4 is in the function selection OFF. When the function selection switch 4 is in the function selection OFF (YES in step S10), the procedure illustrated in FIG. 2 is ended. When the function selection switch 4 is kept the function selection ON (NO in step S10), the procedure returns to step S1.

According to the above configuration, the driving assist system 100 determines whether or not the obstacle detected in the obstacle present determination process is the side-by-side running vehicle, based on whether or not the could value, which is an indicator of the relative velocity of the obstacle, is less than or equal to the first preset value. Therefore, the driving assist system 100 can detect a side-by-side running vehicle with high accuracy. It should be noted that the side-by-side running vehicle typically has a low relative velocity and is an example of the obstacle having a specific relation with the own vehicle. According to the above configuration, moreover, since the driving assist system 100 further takes into account the distance to the obstacle to detect whether the obstacle is side-by-side running vehicle, the driving assist system 100 can avoid detecting a vehicle to which the attention needs not to be paid in the vehicle driving. Therefore, the side-by-side running vehicle detection accuracy can be further enhanced.

The count value serving as an indicator of the relative velocity of the obstacle can be obtained by comparing the phase of the reflected wave (specifically, the received wave) with the phase of the reference signal and generating the binary pulse corresponding to the phase delay and advance of the reflected wave with respect to the reference signal. The phase comparison can be easily carried out with the phase comparator 17a or the like, as described above. Thus, the present embodiment can reduce an amount of time and effort, as compared with a configuration in which frequency analysis is performed to detect a frequency difference between the transmitted wave and the reflected wave and detect the relative velocity of the obstacle based on this frequency difference.

In the above example, the obstacle detection apparatus 1 is configured to detect a side-by-side running vehicle as an example of the obstacle having the specific relation with the own vehicle. However, the obstacle having the specific relation with the own vehicle is not limited to the side-by-side running vehicle. For example, in place of the four transceiving microphones, the driving assist system 100 may use a transceiving microphone 13 to transmit the ultrasonic wave in a rear direction of the own vehicle, and the obstacle detection apparatus 1 may detect an own-vehicle-following vehicle, which is a vehicle following the own vehicle. In this configuration, the transceiving microphone 13 may be installed at a rear bumper of the own vehicle.

Alternatively, in addition to the above-described four transceiving microphones 13, the driving assist system 100 may include a transceiving microphone 13 to transmit the ultrasonic wave in a rear direction of the own vehicle to detect the side-by-side running vehicle and the own-vehicle-following vehicle. In this configuration, by determining which transceiving microphone 13 detects the reflected wave from the obstacle (which transceiving microphone 13 provides, the received wave), the controller 11 may determine whether or not the side-by-side running vehicle or the own-vehicle-following vehicle is present.

According to this configuration, based on magnitude of the count value, the driving assist system 100 can further detect other obstacles than side-by-side running vehicle, and has a high versatility. As a result, it is possible to provide a high versatile driving assist apparatus that can readily detect an obstacle around own vehicle while using a Doppler effect.

When the relative velocity of the obstacle is the same, the phase difference between the reference signal and the reflected wave decreases with decreasing speed of the own vehicle. Thus, the count value decreases with decreasing speed of the own vehicle, provided that the predetermined time (unit time) for the relative speed range determination circuit 17 to count the number of pulses is constant. Because of this, when the predetermined time (unit time) for the relative speed range determination circuit 17 to count the number of pulses is constant, the smaller speed of the own vehicle causes a larger possibility of occurrence of the following situation. The situation is that the count value becomes smaller than the first preset value even when the count value originates from an obstacle whose relative velocity is out of the relative velocity of the obstacles that are to be detected as the side-by-side running vehicle or the own-vehicle-following vehicle. That is, a possibility that the obstacle detection apparatus 1 erroneously detects the side-by-side running vehicle or the own-vehicle-following vehicle may increase.

In view of this, the relative velocity range determination circuit 17 may set the predetermined time so that the smaller the speed of the own vehicle, the longer the predetermined time, based on the vehicle speed of the own vehicle. The controller 11 acquires the vehicle speed of the own vehicle from the vehicle speed sensor 2. The controller 11 can corresponds to a speed information notification acquisition means or section. For example, the predetermined time may be set to increase inversely proportional to the speed of the own vehicle. According to this configuration, the smaller the speed of the own vehicle, the larger the number of pulses to be counted. Therefore, the above-described erroneous detection can be prevented.

When the relative velocity of the obstacle is the same, the phase difference between the reference signal and the reflected wave decreases with decreasing speed of the own vehicle. Thus, the count value decreases with decreasing speed of the own vehicle in cases where (i) the duration of transmission of the ultrasonic wave (i.e., pulse width of the transmission drive wave, see FIG. 6) is constant and (ii) the predetermined time is set to such a larger value that covers all of the peaks of the received wave exceeding the above-described threshold. Thus, when the pulse width of the transmission drive wave is constant, the smaller speed of the own vehicle causes a higher possibility of erroneous detection of the side-by-side running vehicle or the own-vehicle-following vehicle.

Because of this, based on the speed of the own vehicle acquired from the vehicle speed sensor 2, the controller 11 may cause the transmission pulse generator to generate the transmission drive wave having a longer pulse width in response to the decrease in the speed of the own vehicle, so that the smaller the speed of the own vehicle, the longer the duration of transmission of the transmission wave. For example, the predetermined time may be set to increase inversely proportional to the speed of the own vehicle. According to this configuration, the smaller the speed of the own vehicle, the larger the number of pulses to be counted per the predetermined time. Therefore, the above described erroneous detection can be prevented.

Figure 10:
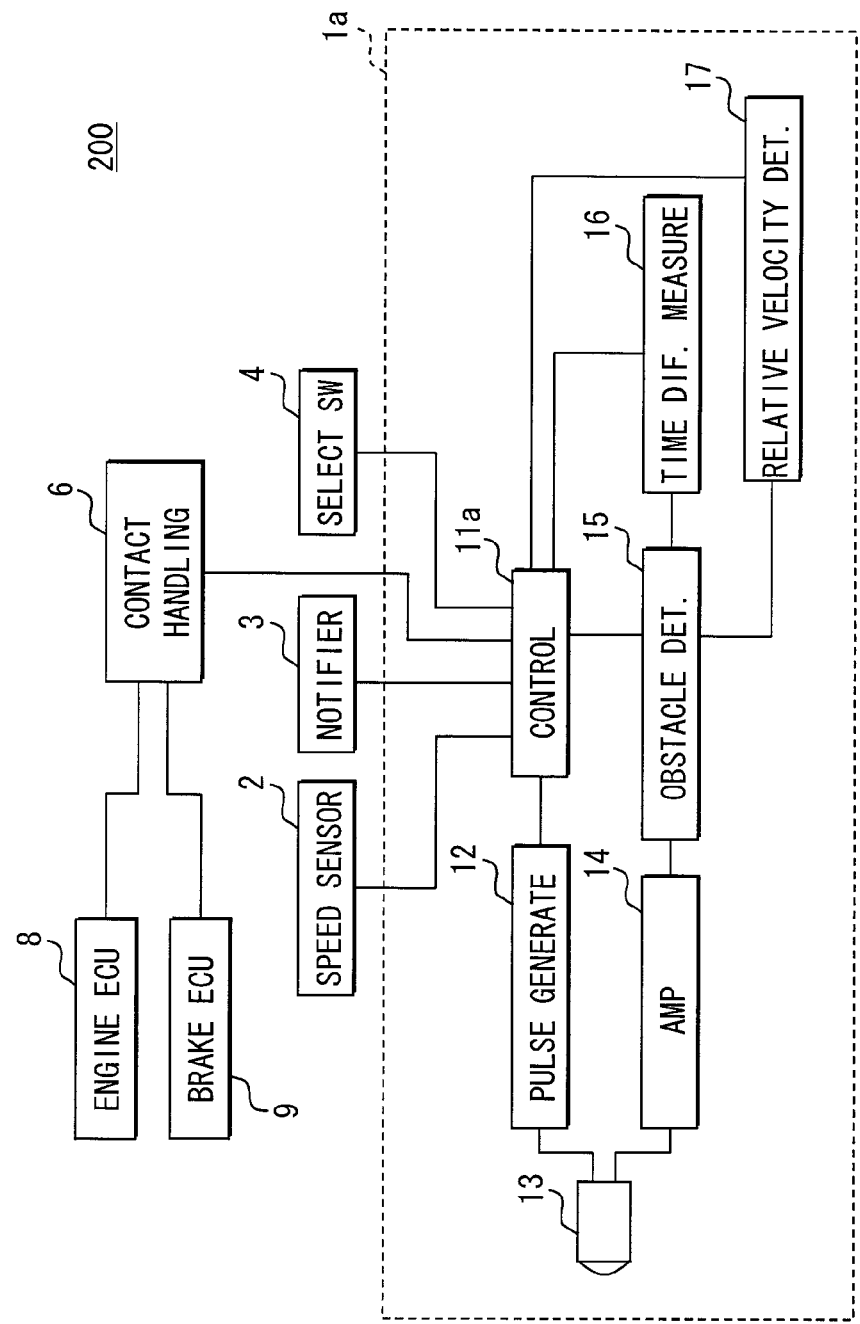
FIG. 10 is a diagram illustrating a driving assist system of another embodiment.

The embodiments are not limited to the above examples. Other embodiments will be described below with reference to the drawings. FIG. 10 is a diagram illustrating a driving assist system 200 of another embodiment. Between the foregoing embodiment and following embodiment, like references used to refer to like parts.

The driving assist system 200 differs from the driving assist system 100 in that the driving assist system 200 detects a contact risk object in stead of the side-by-side running vehicle or the own-vehicle-following vehicle. The contact risk object refers to an object having a risk of contacting with the own vehicle. The driving assist system 200 includes a contact handling apparatus 6, and includes an obstacle detection apparatus 1a in stead of the obstacle detection apparatus 1. The installation place and direction of the transceiving microphone 13 in the driving assist system 200 are different from those in the driving assist system 100. The obstacle detection apparatus 1a has substantially the same configuration as the obstacle detection apparatus 1 expect that the obstacle detection apparatus 1a includes a controller 11a in stead of the controller 11. The contact risk object may be a movable body such as a vehicle, a pedestrian and the like, or a motionless object such as a stopping vehicle, a stopping pedestrian, a power pole and the like. The contact risk object may include a contact risk vehicle, which is a vehicle having a possibility of contacting with the own vehicle.

The contact handling apparatus 6 assists avoiding a collision of the own vehicle with the obstacle or the like, or protects an occupant of the own vehicle when the own vehicle contacts with the obstacle or the like. For example, the contact handling apparatus 6 may cause an engine electronic control unit (ECU) 8 to decrease a driving force or cause a brake ECU 9 to increase a braking force in order to assist avoiding the contact with the obstacle. Alternatively, the contact handling apparatus 6 may cause the brake ECU 9 to increase the braking force to forcibly stop the own vehicle in order to assist avoiding the contact with the obstacle. Alternatively, the contact handling apparatus 6 may perform seat belt fixing (tighten an un-tensioned seat belt) at a time of collision with the obstacle to relax an impact on the occupant of the own vehicle and protect the occupant.

Figure 11:
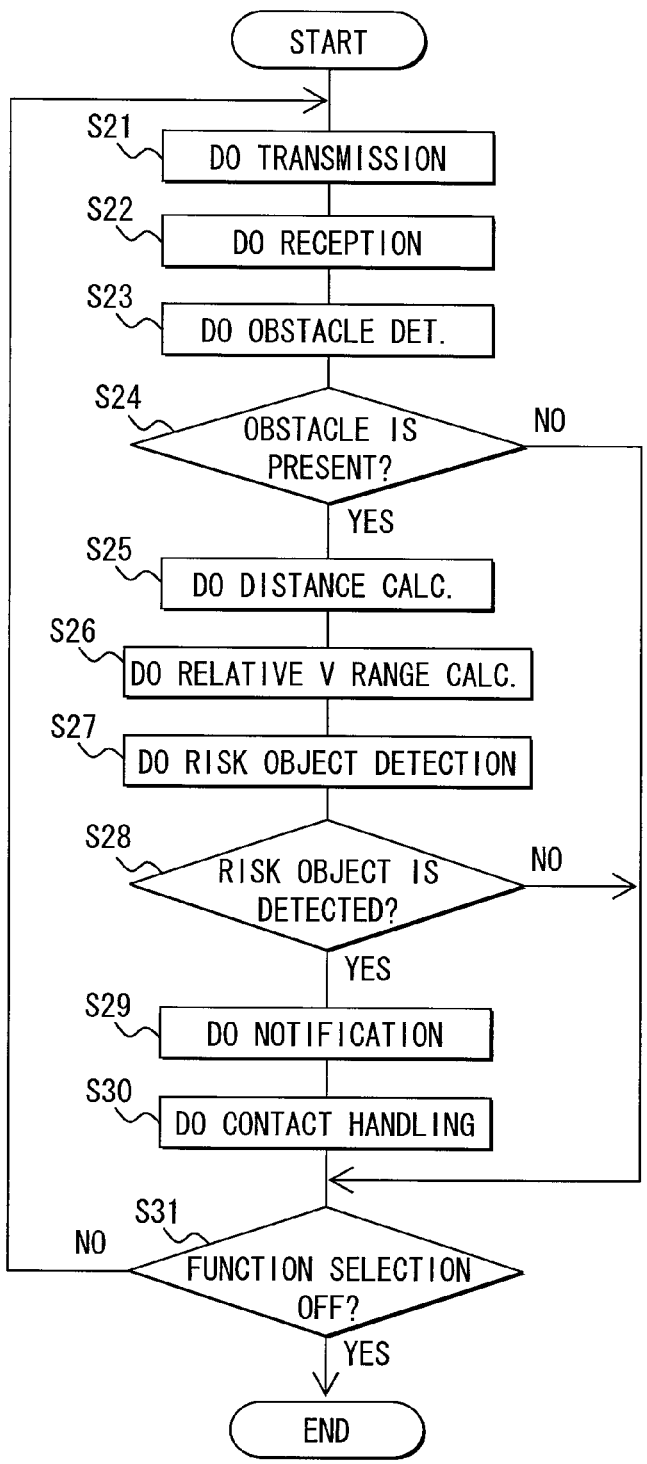
FIG. 11 is flowchart illustrating an operation flow of an obstacle detection apparatus of another embodiment.

The operation flow of the obstacle detection apparatus 1a will be described with reference to FIG. 11. FIG. 11 is a flowchart illustrating an operation flow of the obstacle detection apparatus 1a. When a user manipulates the function selection switch 4 to operate the obstacle to detect the obstacle around the own vehicle, the obstacle detection apparatus 1 starts the operation flow illustrated in FIG. 11. In the present disclosure, a function selection ON state refers to a state in which the detection of the obstacle around the own vehicle is enabled and selected in the function selection switch 4. A function selection OFF state refers to a state in which the detection of the obstacle around the own vehicle is not enabled and selected in the function selection switch 4.

In step S21, the transmission process is performed in a manner similar to that in step S1. In step S22, the reception process is performed in a manner similar to that in step S2. Although the driving assist system 200 can employ a single transceiving microphone 13, it is assumed that the driving assist system 200 employs multiple transceiving microphones 13 to detect obstacles in various directions in the surrounding of the own vehicle.

Figure 12A:
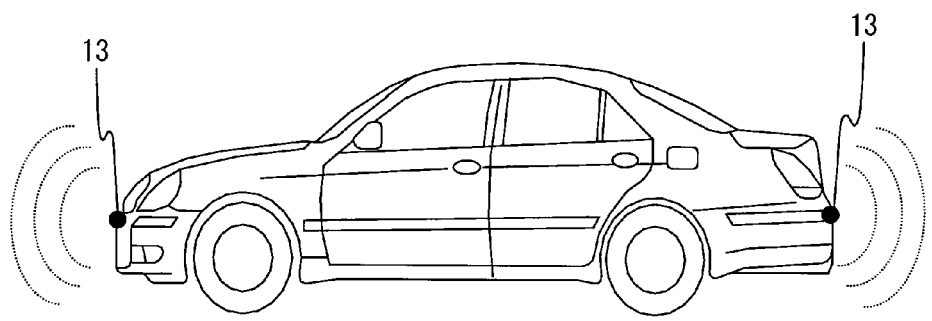
FIGS. 12A and 12B are diagrams illustrating installation places and directions of multiple transceiving microphones in the driving assist system of another embodiment.
Figure 12B:
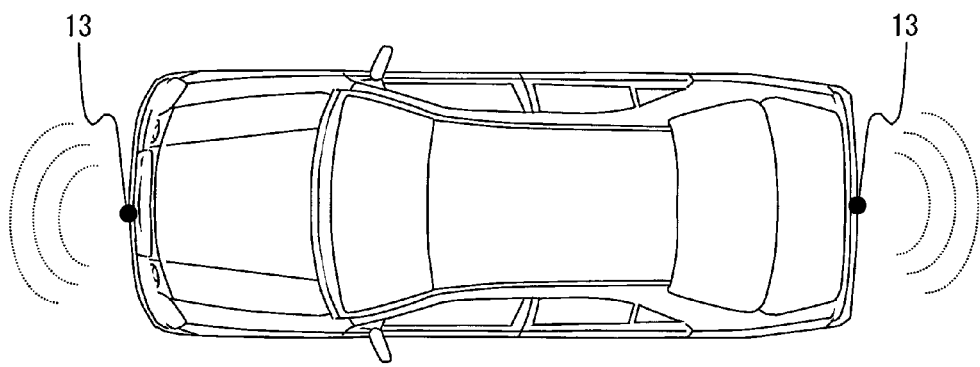

With reference to FIGS. 12A and 12B, installation places of and directions of the multiple transceiving microphones 13 in the driving assist system 200 will be described. FIGS. 12A and 12B are diagrams illustrating installation places of and directions of the multiple transceiving microphones 13 in the driving assist system 200.

As shown in FIGS. 12A and 12B, the driving assist system 200 includes two transceiving microphones 13 (ultrasonic sensors) at a front and a rear of the vehicle body of the own vehicle. For example, the transceiving microphones 13 at the front is installed so that the transceiving microphones 13 transmits the ultrasonic wave in a front direction of the own vehicle to detect an obstacle in front of the own vehicle. The transceiving microphone 13 at the front may be installed n a front bumper or the like of the own vehicle. The transceiving microphones 13 at the rear may be installed so that the transceiving microphones 13 transmits the ultrasonic wave in a rear direction of the own vehicle to detect an obstacle in rear of the own vehicle. The transceiving microphone 13 at the rear may be installed in a rear bumper or the like of the own vehicle.

Explanation returns to FIG. 11. In step S23, the obstacle presence determination process is performed in a manner similar to that in step S3. The controller 11a can correspond to a distance calculation means or section. In the present embodiment, the direction to the obstacle may be determined based on which transceiving microphone provides the received wave. For example, when the transceiving microphone 13 at the front detects the received wave, it is determined that the obstacle is present in front of the own vehicle. When the transceiving microphone 13 at the rear detects the received wave, it is determined that the obstacle is present in rear of the own vehicle.

When the controller 11a determines that the obstacle is present (YES in step S24), the procedure proceeds to step S25. When the controller 11a determines that the obstacle is not present (NO in step S24), the procedure proceeds to step S31. In step S25, the distance calculation process is performed in a manner similar to that in step S5. The controller 11a can correspond to a distance calculation means or section. In step S26, the relative velocity range calculation process is performed in a manner similar to that in step S6.

In step S27, a contact risk object detection process is performed. In the contact risk object detection process, the controller 11a determines whether or not the contact risk object is detected, based on the distance to the obstacle calculated in the distance calculation process and the count value obtained in the relative velocity range calculation process. The controller 11a can correspond to a detection section or means.

More specifically, when (i) the distance to obstacle is less than or equal a predetermined distance and (ii) the count value is greater than or equal to a second preset value, the controller 11a determines that the contact risk object is detected. When (i) the distance to obstacle is not less than or equal a predetermined distance or (ii) the count value is not greater than or equal to a second preset value, the controller 11a determines that the contact risk object is not detected. The controller 11a can correspond to a second threshold determination means or section. The second preset value can correspond to a second threshold. In the contact risk object detection process, based on whether not the could value is greater than or equal to the second preset value, the controller 11a determines whether or not the relative velocity is greater than or equal to a given value to detect the contact risk object.

The predetermined distance recited herein is an arbitrarily settable distance at which the risk of collision of the own vehicle with the obstacle is considered to be high. This predetermined distance may be set according to the vehicle speed from the vehicle speed sensor 2. For example, the predetermined distance may be set so that the larger the vehicle speed, the smaller the predetermined distance. The second preset value is arbitrarily settable according to relative velocities of objects (e.g., vehicles) that are to be detected as the contact risk objects.

When the contact risk object is detected in the contact risk object detection process in step S28 (YES in step S28), it is concluded that the contact risk object is detected. In this case, the procedure proceeds to step S29. When the contact risk object is not detected in the contact risk object detection process in step S28 (NO in step S28), it is concluded that the contact risk object is not detected. In this case, the procedure proceeds to step S31.

In step S29, the notification process is performed. In the notification process, the controller 11a instructs the notification device 3 to notify that the contact risk object is present. The controller 11a can correspond to a notification means or section. According to the above manners, the driver can recognize the risk of contact of the own vehicle with a different vehicle, a pedestrian, a structure body, or the like. A manner of notifying the presence of the contact risk object may include a warning sound output, a guidance speed, an indicator display, a tent display, a icon display, and the like. When the driving assist system 200 is configured to further detect the direction to the contact risk object, the direction to the contact risk object may be also notified.

In step S30, a contact handling process is performed. In the contact handling process, the controller 11a may operate the contact handling apparatus 6 to assist avoiding the contact with the contact risk object by decreasing the speed of the own vehicle or forcibly stopping the own vehicle. Alternatively, the controller 11a may operate the contact handling apparatus 6 to perform the seat belt fixing to relax the impact on the occupant at the time of collision with the contact risk object. The controller 11a can correspond to a contact handling means or section. When the driving assist system 200 is configured to detect the direction to the obstacle, a process according to the direction to the contact risk object may be performed. For example, when it is determined that the obstacle is present in front of the own vehicle, the driving assist system 200 may decrease the speed of the own vehicle, forcibly stop the own vehicle, or perform the seat belt fixing. When it is determined that the obstacle is present in the rear of the own vehicle, the driving assist system 200 may perform the seat belt fixing without decreasing the speed of the own vehicle or forcibly stopping the own vehicle.

In step S31, it is determined whether the function selection switch 4 is in the function selection OFF. When the function selection switch 4 is in the function selection OFF (YES in step S31), the operation flow illustrated in FIG. 11 is ended. When the function selection switch 4 is in the function selection ON (NO in step S31), the procedure returns to step S21 to perform again the operation flow illustrated in FIG. 11.

According to the above configuration, the driving assist system 200 determines whether or not the obstacle detected in the obstacle present determination process is the contact risk object, based on whether or not the count value, which is an indicator of the relative velocity of the obstacle, is greater than or equal to the second preset value. Therefore, the driving assist system 200 can highly-accurately detect the contact risk object having the high elative velocity. Moreover, since the driving assist system 200 further takes into account the distance to the obstacle to determine whether or not the detected obstacle is the contact risk objet, the driving assist system 200 can avoid detecting a distance obstacle having a low risk of collision. Therefore, the detection accuracy of the contact risk object can be enhanced.

In the above-described example, the obstacle detection apparatus 1a can detect the contact risk objects in front of and in rear of the own vehicle. Alternatively, the transceiving microphone 13 may be installed only at the front portion of the own vehicle, so that only the contact risk object in front of the own vehicle is detected. Alternatively, the transceiving microphone 13 is installed only at the rear portion of the own vehicle, so that only the contact risk object in rear of the own vehicle is detected.

According to this configuration it is possible to detect the obstacles other than the side-by-side running vehicle based on the count value, thereby providing a high versatility to the system. As a result, it is possible provide a high versatile driving assist apparatus that can readily detect an obstacle around own vehicle while using a Doppler effect.

Although the above-described embodiments individually illustrate the driving assist system 100 and the driving assist system 200, the driving assist systems 100 and 200 may be combined with each other so as to share a duplicative configuration. That is, one system may be configured to detect the side-by-side running vehicle, the own-vehicle-following vehicle and the contact risk object based on the count value.

In the above-described embodiments, the ultrasonic wave is used to detect an obstacle. Alternatively, searching waves (transmitted wave) other than the ultrasonic wave can be used as long as the frequency of the searching wave is shifted by the Doppler effect. Fore example, electromagnetic wave such as millimeter wave, infrared wave and the like can be used.

The present disclosure has various aspects. For example, according to an aspect of the present disclosure, a driving assist apparatus mounted to an own vehicle is provided. The driving assist apparatus comprises: a transmitter configured to successively transmit a transmission wave having a constant frequency to a surrounding of the own vehicle; a receiver configured to successively receive a reflected wave of the transmission wave; an obstacle presence determination section configured to determine a presence and an absence of an obstacle in the surrounding of the own vehicle based on the reflected wave received by the receiver; a measurement section configured to compare phase of the reflected wave, which is received by the receiver, with phase of a reference signal, which has a frequency synchronized with the frequency of the transmission wave, and thereby measure a frequency of delay and a frequency of advance of the phase of the reflected wave with respect to the phase of the reference signal; and a detection section configured to detect the obstacle having a specific relation with the own vehicle, based on the presence of the obstacle determined by the obstacle presence determination section and the frequency of delay and the frequency of advance measured by the measurement section.

According to the above configuration, the driving assist apparatus can have a high versatility, and readily detect an obstacle around own vehicle while using a Doppler effect.

The driving assist apparatus may be configured in the following way. The measurement section includes a binary pulse generation section and a count section. The binary pulse generation section is configured to compare the phase of the reflected wave with the phase of the reference signal to generate a binary pulse, the binary pulse corresponding to the delay and advance of the phase of the reflected wave with respect to the phase of the reference signal. The count section is configured to obtain a count value by counting a number of pulses of the binary pulse per predetermined time. The detection section detects the obstacle having the specific relation with the own vehicle, based on (i) the presence of the obstacle determined by the obstacle presence determination section and (ii) the count value obtained by the count section. In the above, the number of pulses may refer to the number of repetition of a pulsed activity (transition to a high level and then to a low level), the number of rising edge, the number of falling edges, or the like.

As the relative velocity of the obstacle is larger, the frequency of the reflected wave reflected by the obstacle is shifted from the frequency of the reference signal to a larger extent. Thus, as the relative velocity of the obstacle becomes larger, the number of times the phase of the reflected wave is advanced or delayed with respect to the phase of the reference signal per a given period becomes larger. Because of this, the count value contend by the count section increases with increasing relative velocity of the obstacle, and the count value contend by the count section decreases with decreasing relative velocity of the obstacle. Therefore, based on magnitude of the count value, a side-by-side running vehicle and/or an own-vehicle-following vehicle having a small relative velocity can be detected with high accuracy. Additionally, the contact risk object having a risk of contacting with the own vehicle and having a large relative velocity can be detected with high accuracy.

The count value serving as an indicator of the relative velocity of the obstacle can be obtained by comparing the phase of the reflected wave with the phase of the reference signal, generating the binary pulse corresponding to the phase delay and advance of the reflected wave with respect to the reference signal, and counting the number of pulses of the binary pulse per predetermined time. For example, the phase comparison can be easily carried out with a phase comparator or the like, as described above. Thus, the above driving assist apparatus can reduce an amount of time and effort, as compared with a comparison example in which frequency analysis is performed to detect a frequency difference between the transmitted wave and the reflected wave and detect the relative velocity of the obstacle based on this frequency difference. As can be seen, according to the configuration, the driving assist apparatus can detect obstacles other than the side-by-side running vehicle and can have a high versatility.

As a result, it is possible to provide the driving assist apparatus that can have a high versatility, and readily detect an obstacle around own vehicle while using a Doppler effect.

When the relative velocity of the obstacle is the same, the phase difference between the reference signal and the reflected wave decreases with decreasing speed of the own vehicle. Thus, the count value decreases with decreasing speed of the own vehicle, provided that the predetermined time for the count section to count the number of pulses is constant. Because of this, when the predetermined time for the count section to count the number of pulses is constant, a possibility of an erroneous detection of the detection section may increase with decreasing speed of the own vehicle. In view of this, the driving assist apparatus may further comprise a speed information acquisition section configured to acquire information on speed of the own vehicle, wherein. Based on the information on the speed of the own vehicle acquired by the speed information acquisition section, the count section may set the predetermine time so that the smaller the speed of the own vehicle, the longer the predetermined time. According to this configuration, the erroneous detection can be prevented.

When the relative velocity of the obstacle is the same, the phase difference between the reference signal and the reflected wave decreases with decreasing speed of the own vehicle. Thus, when duration of transmission of the transmission wave from the transmitter is constant, the count value decreases if the predetermined time is insufficient. Because of this, when the duration of transmission of the transmission wave from the transmitter is constant, the possibility of an erroneous detection of the detection section may increase with decreasing speed of the own vehicle. In view of this, the driving assist apparatus may further comprise a speed information acquisition section configured to acquire information on speed of the own vehicle. Based on the information on the speed of the own vehicle acquired by the speed information acquisition section, the transmitter may set the duration of transmission of the transmission wave so that the smaller the speed of the own vehicle, the longer the duration of transmission. According to this configuration, the erroneous detection can be prevented.

The above driving assist apparatus may further comprise a first threshold determination section. The first threshold determination section compares the count value with a first threshold, thereby determining whether or not the count value is less than or equal to the first threshold. The detection section may detect that one of an side-by-side running vehicle and an own-vehicle-following vehicle is present, when (i) the obstacle presence determination section determines that the obstacle is present and (ii) the first threshold determination section determines that the count value is less than or equal to the first threshold. As explained above, since the count value counted by the count section decreases with decreasing relative velocity of the obstacle, the above driving assist apparatus can highly-accurately detect the side-by-side running vehicle or the own-vehicle-following vehicle, which typically have a small relative velocity.

Alternatively, the above driving assist apparatus may further comprise a second threshold determination section. The second threshold determination section is configured to compare the count value with a second threshold, thereby determining whether or not the count value is greater than or equal to the second threshold. The detection section may detect that a contact risk object is present, when (i) the obstacle presence determination section determines that the obstacle is present and (ii) the second threshold determination section determines that the count value is greater than or equal to the second threshold. The contact risk object is an object associated with a risk of contacting with the own vehicle. As explained above, since the count value counted by the count section increases with increasing relative velocity of the obstacle, the above driving assist apparatus can highly accurately detect the contact risk object having a large relative velocity.

Alternatively, the driving assist apparatus may comprise both of the first threshold determination section and the second threshold determination section. According to this configuration, the above driving assist apparatus can highly accurately detect the side-by-side running vehicle or the own-vehicle-following vehicle having a small relative velocity, and the contact risk object having a large relative velocity.

The above driving assist apparatus may further comprise a contact handling section configured to perform at least one of a contact avoiding assist operation and an occupant protection operation. The contact avoiding assist operation is performed to assist avoiding the contact of the own vehicle with the contact risk object when the detection section detects that the contact risk object is present. The occupant protection operation is performed to operate a protection apparatus to protect an occupant of the own vehicle when the own vehicle contacts with the contact risk object. According to this configuration, it is possible to help avoiding the contact with the contact risk object, and it is possible to relax an impact on the occupant at the time of contacting with the contact risk object.

The above driving assist apparatus may further comprise a distance calculation section configured to calculate a distance to the obstacle based on a time difference between transmission of the transmission wave and reception of the reflected wave. The detection section detects the one of the side-by-side running vehicle and the own-vehicle-following vehicle based on (i) the presence of the obstacle determined by the obstacle presence determination section, (ii) the count value less than or equal to the first threshold determined by the first threshold determination section, and (iii) the distance to the obstacle calculated by the distance calculation section. According to this configuration, it becomes possible to detect the side-by-side running vehicle or the own-vehicle-following vehicle by further taking into account the distance. For example, when the distance to the obstacle is less than or equal to a predetermined distance, it can be determined that the obstacle is the side-by-side running vehicle or the own-vehicle-following vehicle. When the distance to the obstacle is greater than the predetermined distance, it can be determined that the obstacle is not the side-by-side running vehicle or the own-vehicle-following vehicle. Therefore, the detection accuracy can be further enhanced.

The above driving assist apparatus may be configured in the following way. The detection section detects the contact risk object based on (i) the presence of the obstacle determined by the obstacle presence determination section, (ii) the count value greater than or equal to the second threshold determined by the second threshold determination section, and (iii) the distance to the obstacle calculated by the distance calculation section. According to this configuration, it becomes possible to detect the contact risk object by further taking into account the distance. For example, when the distance to the obstacle is less than or equal to a predetermined distance, it can be determined that the obstacle is the contact risk object. When the distance to the obstacle is greater than the predetermined distance, it can be determined that the obstacle is not the contact risk object. Therefore, the detection accuracy can be further enhanced.

The above driving assist apparatus may further comprise a notification section configured to perform a notification operation according to a detection result of the detection section. According to this configuration, an occupant of the own vehicle can recognize the presence of the side-by-side running vehicle, the own-vehicle-following vehicle and/or the contact risk object detected by the detection section.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving assist apparatus mounted to an own vehicle, comprising:
   a transmitter configured to successively transmit a transmission wave having a constant frequency to a surrounding of the own vehicle;
   a receiver configured to successively receive a reflected wave of the transmission wave;
   an obstacle presence determination section configured to determine a presence and an absence of an obstacle in the surrounding of the own vehicle based on the reflected wave received by the receiver;
   a measurement section configured to
      compare phase of the reflected wave, which is received by the receiver, with phase of a reference signal, which has a frequency synchronized with the frequency of the transmission wave, and thereby measure delay and advance of the phase of the reflected wave with respect to the phase of the reference signal; and a detection section configured to detect the obstacle having a specific relation with the own vehicle, based on the presence of the obstacle determined by the obstacle presence determination section and the the delay and advance of the phase of the reflected wave with respect to the phase of the reference signal as measured by the measurement section.

2. The driving assist apparatus according to claim 1, wherein:

the measurement section includes a binary pulse generation section configured to compare the phase of the reflected wave with the phase of the reference signal to generate a binary pulse, the binary pulse corresponding to the delay and advance of the phase of the reflected wave with respect to the phase of the reference signal, and a count section configured to obtain a count value by counting a number of pulses of the binary pulse per predetermined time; and the detection section detects the obstacle having the specific relation with the own vehicle, based on the presence of the obstacle determined by the obstacle presence determination section and the count value obtained by the count section.

3. The driving assist apparatus according to claim 2, further comprising:

a speed information acquisition section configured to acquire information on speed of the own vehicle, wherein:

based on the information on the speed of the own vehicle acquired by the speed information acquisition section, the count section sets the predetermine time so that the smaller the speed of the own vehicle, the longer the predetermined time.

4. The driving assist apparatus according to claim 2, further comprising:

a speed information acquisition section configured to acquire information on speed of the own vehicle, wherein:

based on the information on the speed of the own vehicle acquired by the speed information acquisition section, the transmitter sets duration of transmission of the transmission wave so that the smaller the speed of the own vehicle, the longer the duration of transmission.

5. The driving assist apparatus according to claim 2, further comprising:

a first threshold determination section configured to compare the count value, which is obtained by the count section, with a first threshold to determine whether or not the count value is less than or equal to the first threshold, wherein;

the detection section detects that one of an side-by-side running vehicle and an own-vehicle-following vehicle is present, when the obstacle presence determination section determines that the obstacle is present and the first threshold determination section determines that the count value is less than or equal to the first threshold;

the side-by-side running vehicle is a vehicle running side-by-side with the own vehicle; and the own-vehicle-following vehicle is a vehicle following the own vehicle.

6. The driving assist apparatus according to claim 5, further comprising:

a distance calculation section configured to calculate a distance to the obstacle based on a time difference between transmission of the transmission wave and reception of the reflected wave, wherein:

the detection section detects the one of the side-by-side running vehicle and the own-vehicle-following vehicle based on the presence of the obstacle determined by the obstacle presence determination section, the count value less than or equal to the first threshold determined by the first threshold determination section, and the distance to the obstacle calculated by the distance calculation section.

7. The driving assist apparatus according to claim 2, further comprising:

a second threshold determination section configured to compare the count value, which is obtained by the count section, with a second threshold to determine whether or not the count value is greater than or equal to the second threshold, wherein:

the detection section detects that a contact risk object, which is an object having a risk of contacting with the own vehicle, is present, when the obstacle presence determination section determines that the obstacle is present and the second threshold determination section determines that the count value is greater than or equal to the second threshold.

8. The driving assist apparatus according to claim 7, further comprising:

a contact handling section configured to perform at least one of a contact avoiding assist operation to assist avoiding the contact of the own vehicle with the contact risk object when the detection section detects that the contact risk object is present and an occupant protection operation to operate a protection apparatus to protect an occupant of the own vehicle when the own vehicle contacts with the contact risk object.

9. The driving assist apparatus according to claim 7, further comprising:

a distance calculation section configured to calculate a distance to the obstacle based on a time difference between transmission of the transmission wave and reception of the reflected wave, wherein:

the detection section detects the contact risk object based on the presence of the obstacle determined by the obstacle presence determination section, the count value greater than or equal to the second threshold determined by the second threshold determination section, and the distance to the obstacle calculated by the distance calculation section.

10. The driving assist apparatus according to claim 2, further comprising:

a first threshold determination section configured to compare the count value, which is obtained by the count section, with a first threshold to determine whether or not the count value is less than or equal to the first threshold; and a second threshold determination section configured to compare the count value, which is obtained by the count section, with a second threshold to determine whether or not the count value is greater than or equal to the second threshold, wherein:

the detection section detects that one of an side-by-side running vehicle, which is a vehicle running side-by-side with the own vehicle, and an own-vehicle-following vehicle, which is vehicle following the own vehicle, is present, when
- the obstacle presence determination section determines that the obstacle is present and
- the first threshold determination section determines that the count value is less than or equal to the first threshold; and the detection section detects that a contact risk object, which is an object having a risk of contacting with the own vehicle, is present, when
- the obstacle presence determination section determines that the obstacle is present and
- the second threshold determination section determines that the count value is greater than or equal to the second threshold.

11. The driving assist apparatus according to claim 1, further comprising:
a notification section configured to perform a notification operation according to a detection result of the detection section.

12. The driving assist apparatus according to claim 1, wherein:
the obstacle having the specific relation with the own vehicle detected by the detection section includes at least one of
- a side-by-side running vehicle, which is a vehicle running side-by-side with the own vehicle,
- a contact risk vehicle, which is a vehicle having a possibility of contacting with the own vehicle, and
- a own-vehicle-following vehicle, which is a vehicle following the own vehicle.

* * * * *